United States Patent
Eluri et al.

(10) Patent No.: US 9,740,582 B2
(45) Date of Patent: Aug. 22, 2017

(54) SYSTEM AND METHOD OF FAILOVER RECOVERY

(71) Applicant: SYBASE, INC., Dublin, CA (US)

(72) Inventors: Amarnadh Sai Eluri, Pleasanton, CA (US); Nikhil Jamadagni, Fremont, CA (US); Sarika Iyer, Fremont, CA (US)

(73) Assignee: SYBASE, INC., Dublin, CA (US)

( * ) Notice: Subject to any disclaimer, the term of this patent is extended or adjusted under 35 U.S.C. 154(b) by 79 days.

(21) Appl. No.: 14/984,567

(22) Filed: Dec. 30, 2015

(65) Prior Publication Data

US 2017/0192863 A1    Jul. 6, 2017

(51) Int. Cl.
*G06F 11/07* (2006.01)
*G06F 11/20* (2006.01)
*G06F 17/30* (2006.01)

(52) U.S. Cl.
CPC .... *G06F 11/2033* (2013.01); *G06F 17/30362* (2013.01); *G06F 17/30587* (2013.01); *G06F 2201/80* (2013.01); *G06F 2201/805* (2013.01)

(58) Field of Classification Search
CPC ............. G06F 11/0727; G06F 11/1464; G06F 11/203; G06F 11/2033; G06F 11/2043
USPC .......................................................... 714/6.3
See application file for complete search history.

(56) References Cited

U.S. PATENT DOCUMENTS

| | | | |
|---|---|---|---|
| 5,970,488 A * | 10/1999 | Crowe | G06F 17/30575 707/656 |
| 6,751,616 B1 * | 6/2004 | Chan | G06F 17/3033 |
| 6,920,454 B1 * | 7/2005 | Chan | G06F 9/5061 |
| 8,694,639 B1 * | 4/2014 | Vermeulen | G06F 9/5011 709/226 |
| 8,924,370 B2 * | 12/2014 | Shadmon | G06F 17/30362 707/704 |
| 2010/0023521 A1 * | 1/2010 | Arcese | G06F 17/30362 707/E17.007 |
| 2011/0191561 A1 * | 8/2011 | Brassow | G06F 12/14 711/163 |
| 2013/0067188 A1 * | 3/2013 | Mehra | G06F 3/0605 711/170 |
| 2016/0019253 A1 * | 1/2016 | Chan | G06F 17/30362 707/704 |
| 2016/0246802 A1 * | 8/2016 | Regni | G06F 17/30362 |

* cited by examiner

Primary Examiner — Chae Ko
(74) Attorney, Agent, or Firm — Schwegman Lundberg & Woessner, P.A.

(57) ABSTRACT

In some example embodiments, a method comprises: receiving, by a first node of a plurality of nodes in a distributed database system on a shared disk cluster infrastructure, a transaction request to perform a user database transaction a data item in a user database on a shared disk; acquiring, by the first node, a transaction lock for the data item; storing a lock file for the user database transaction in a lock information database on the shared disk, the lock file comprising lock information for the transaction lock and an indication of a status of the user database transaction, and the lock information comprising an identification of a location of the data item; and storing a transaction record of the user database transaction in the user database on the shared disk subsequent to the storing of the lock file in the lock information database on the shared disk.

20 Claims, 12 Drawing Sheets

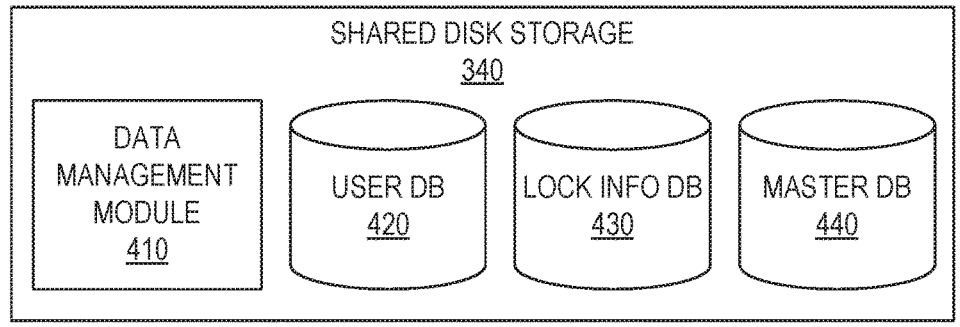
*FIG. 4*
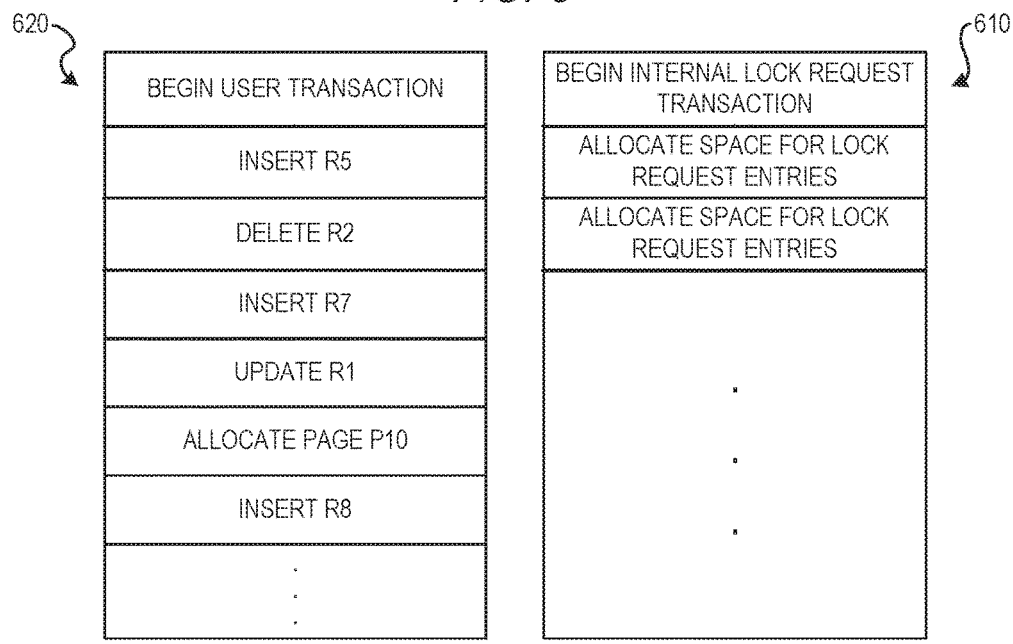
*FIG. 5*
*FIG. 6*

SYSTEM AND METHOD OF FAILOVER RECOVERY

TECHNICAL FIELD

The present application relates generally to the technical field of data processing, and, in various embodiments, to systems and methods of failover recovery.

BACKGROUND

Node failover recovery is one of the critical components of a distributed database hosted on a shared disk cluster (SDC) infrastructure. Node failover involves recovering from uncommitted changes performed by tasks at the failed node in the SDC environment, as well as restricting access to the affected data items until the data items come to a consistent state. For example, access is restricted by using proper concurrency control locks acquired on the uncommitted data items by the node performing the failover recovery of the failed node. There are various mechanisms developed to detect the identity of the uncommitted data items of the failed node. One of the commonly used mechanisms is to replicate transaction lock information while the locks are acquired by the active tasks. For example, during the course of the transactions, the threads accessing the data item acquires a lock on the data item, and the lock information is replicated to the other nodes in the cluster. When the node having active transactions goes down (failure of the node), then the node recovering the changes of the failed node will restrict the access to the uncommitted data by using the replicated lock information. In some cases, the failover recovery of a node in the distributed database hosted on shared data devices involves rebuilding the locks space using the replicated locks, acquiring locks (e.g., locks associated with incomplete transactions at the failed node), and recovering the database to a consistent state. The access to the effecting database is restricted until the locks are acquired by the failover recovery thread. As the locks are replicated with the intention of supporting the failover recovery, every transaction has to follow the protocol and creates lock replicas at the other node. If the transaction is committed, then the replicas are not useful and need further cleaning. This is a computationally expensive operation because: (a) the number of lock resources is increased (at least doubled) in the system; (b) it involves expensive messaging across the nodes while acquiring the locks and will impact the throughput of the system; and (c) it adds more work to the garbage collection thread of reclaiming the lock resources.

BRIEF DESCRIPTION OF THE DRAWINGS

Some example embodiments of the present disclosure are illustrated by way of example and not limitation in the figures of the accompanying drawings, in which like reference numbers indicate similar elements, and in which:

FIG. 4 is a block diagram illustrating a shared disk storage, in accordance with some example embodiments;

FIG. 5 illustrates a lock request file comprising lock request entries, in accordance with some example embodiments;

FIG. 6 illustrates information logged by an internal transaction that stores lock information along with user transaction log records, in accordance with some example embodiments;

DETAILED DESCRIPTION

Figure 1:
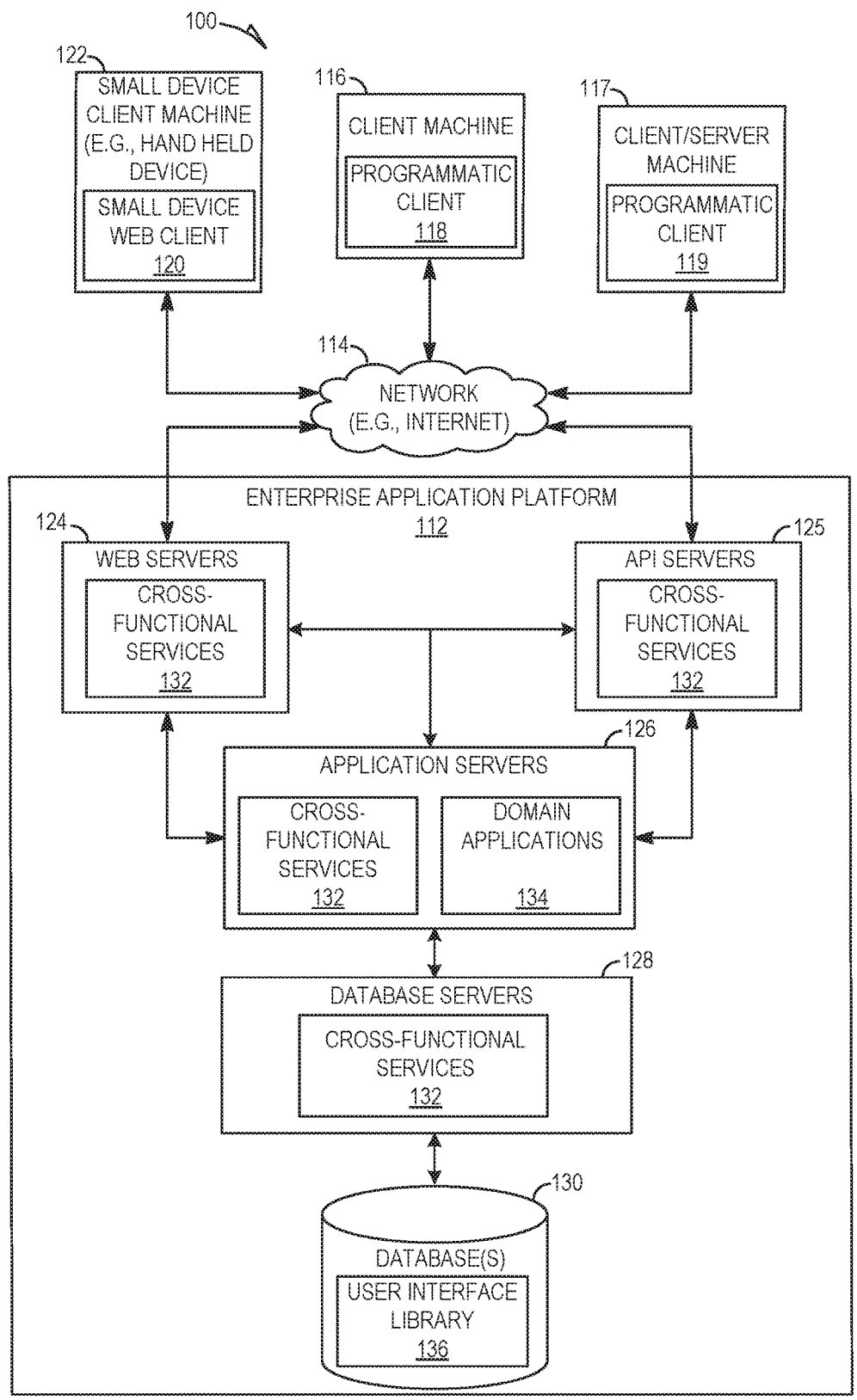
FIG. 1 is a network diagram illustrating a client-server system, in accordance with some example embodiments.

Example methods and systems of failover recovery are disclosed. In the following description, for purposes of explanation, numerous specific details are set forth in order to provide a thorough understanding of example embodiments. It will be evident, however, to one skilled in the art that the present embodiments can be practiced without these specific details.

The present disclosure provides features designed to provide the necessary information to restrict the access to the uncommitted data as part of the failover recovery with minimal impact on the runtime tasks, without adding any additional network messages, and being optimized to re-use the system resources.

As used herein, the terms "database disk" and "database device" can mean disk storage space allocated for a database process used for storing tables. The features provided herein can be applied to a distributed database system that is hosted on a shared disk infrastructure, where database devices are hosted on a shared disk (e.g., the database devices are accessible from all of the nodes in the cluster where the database server is active and configured for the SDC environment).

In some example embodiments, a computer-implemented method comprises: receiving, by a first node of a plurality of nodes in a distributed database system on a shared disk cluster infrastructure, a transaction request to perform a user database transaction on one or more data items in a user database on a shared disk on the shared disk cluster infrastructure, the user database transaction comprising one or more database write operations for the one or more data items in the user database, and the shared disk being accessible by the plurality of nodes; acquiring, by the first node, a corresponding transaction lock for each one of the one or more data items of the user database transaction; storing, by at least one processor, a lock file for the user database transaction in a lock information database on the shared disk, the lock information database being a node-local database of the first node, the first node being the only node in the plurality of nodes able to write to the lock information database, the plurality of nodes other than the first node being able to read from the lock information database during a failover event for the first node, the lock file comprising corresponding lock information for each transaction lock of the user database transaction and an indication of a status of the user database transaction, and the corresponding lock information comprising an identification of a location of the corresponding data item for each corresponding transaction lock; and storing, by the at least one processor, a transaction record of the user database transaction in a transaction log in the user database on the shared disk subsequent to the storing of the lock file in the lock information database on the shared disk.

In some example embodiments, the computer-implemented method further comprises: detecting a failover event for the first node; accessing, by a second node of the plurality of nodes, the lock file in the lock information database of the first node on the shared disk based on the detecting the failover event; determining, by the second node, that the user database transaction is incomplete based on the indication of the status in the accessed lock file; acquiring, by the second node, each corresponding transaction lock for the one or more data items of the user database transaction based on the determination that the user database transaction is incomplete, causing the second node to be the only node in the plurality of nodes able to access the one or more data items in the user database, and performing, by the second node, a database recovery of the user database subsequent to the transaction lock being acquired by the second node, the database recovery restoring the user database up to a point of the failover event.

In some example embodiments, the method further comprises: completing, by the first node, the user database transaction on the user database on the shared disk concurrent with the first node having the transaction lock, the completing of the user database transaction comprising committing to the user database transaction or rolling back the user database transaction; and queuing the file for garbage collection based on the completing the user database transaction.

In some example embodiments, the one or more database write operations comprise one or more data manipulation language (DML) write operations. In some example embodiments, the indication of the location of the data item comprises at least one of a database identification, a page identification, and a row identification. In some example embodiments, the lock information further comprises an identification of a type of the transaction lock. In some example embodiments, the lock file further comprises an identification of the user database transaction.

The methods or embodiments disclosed herein may be implemented as a computer system having one or more modules (e.g., hardware modules or software modules). Such modules may be executed by one or more processors of the computer system. In some example embodiments, a non-transitory machine-readable storage device can store a set of instructions that, when executed by at least one processor, causes the at least one processor to perform the operations and method steps discussed within the present disclosure.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117 and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can implement partition level operation with concurrent activities. For example, the enterprise application platform 112 can implement a partition level lock, a schema lock mechanism, manage activity logs for concurrent activity, generate and maintain statistics at the partition level, and efficiently build global indexes. The enterprise application platform 112 is described in greater detail below in conjunction with FIG. 2.

Figure 2:
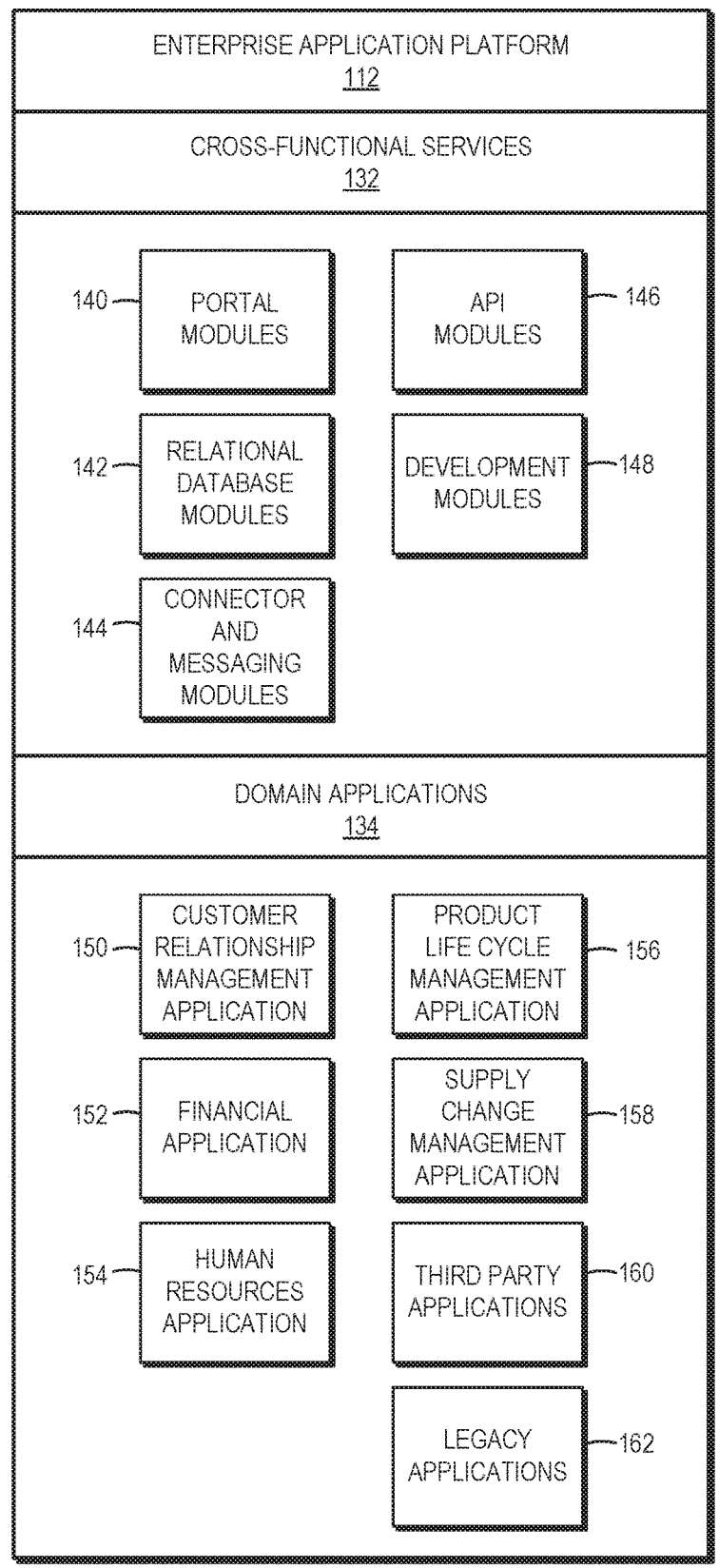
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services and exchange information with other users and within a defined scope. For example, the role can determine the content that is available to the user and the activities that the user can perform. The portal modules 140 include a generation module, a communication module, a receiving module and a regenerating module. In addition the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 can provide support services for access to the database(s) 130, which includes a user interface library 136. The relational database modules 142 can provide support for object relational mapping, database independence and distributed computing. The relational database modules 142 can be utilized to add, delete, update and manage database elements. In addition, the relational database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real time information.

The product life cycle management applications 156 can enable the management of a product throughout the life cycle of the product. For example, the product life cycle management applications 156 can enable collaborative engineering, custom product development, project management, asset management and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
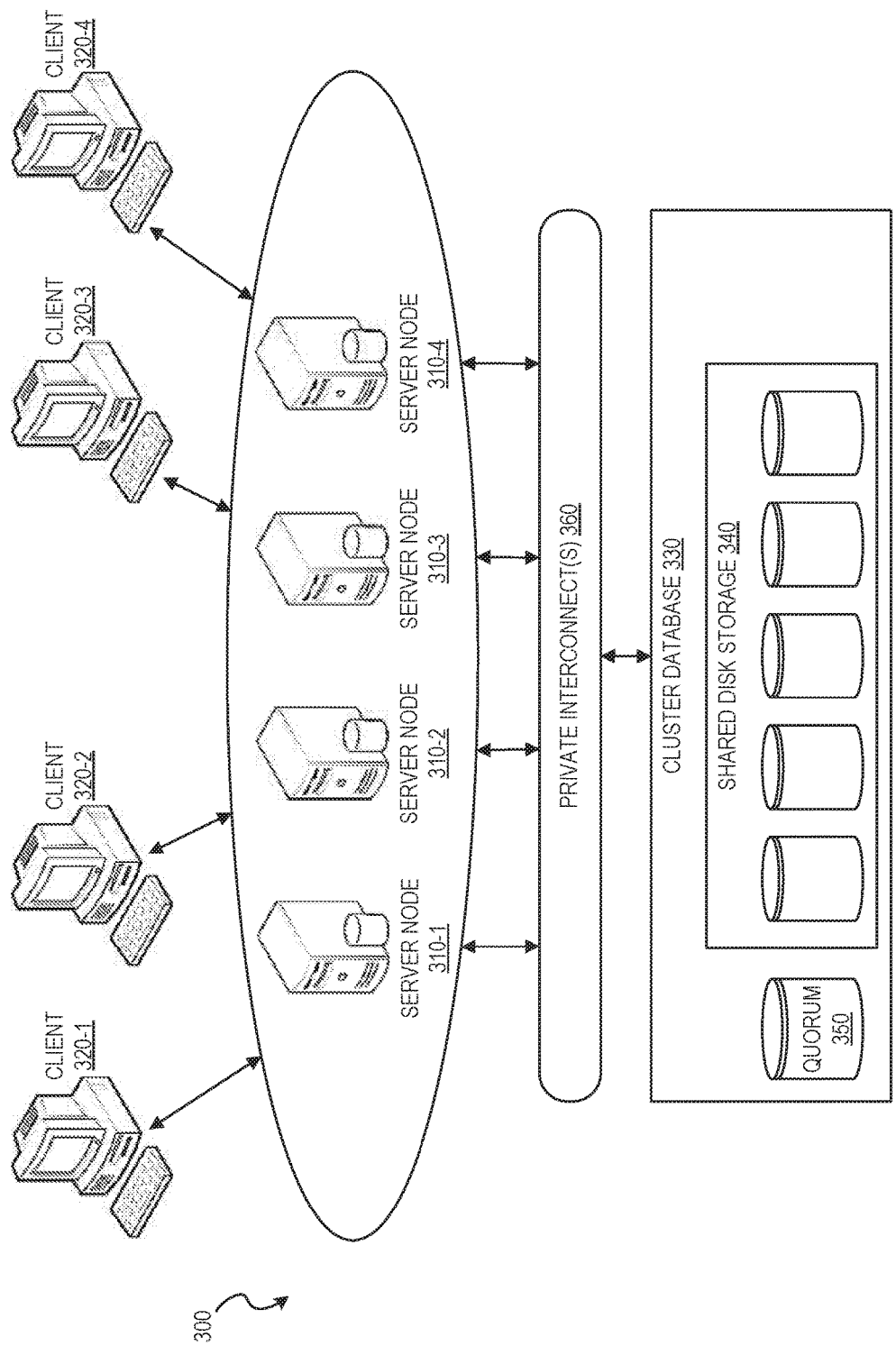
FIG. 3 is a block diagram illustrating a distributed database management system, built-in on a shared disk infrastructure where the database is hosted on devices carved off of a shared disk, in accordance with some example embodiments.

FIG. 3 is a block diagram illustrating components of a distributed database management system hosted on a shared disk cluster (SDC) infrastructure 300, in accordance with some example embodiments. In some example embodiments, the distributed database management system 300 is incorporated into the application server(s) 126 and/or the database server(s) 128 in FIG. 1. However, it is contemplated that other configurations of the distributed database management system and its components are also within the scope of the present disclosure.

In some example embodiments, the SDC architecture 300 comprises a system that has a cluster of two or more server nodes 310 (e.g., nodes 310-1, 310-2, ..., 310-N) having shared access to a shared disk storage 340 (e.g., shared access to the same disk image of the database) via a network connection, such as one or more private interconnects 360. In some example embodiments, the server nodes 310 can be accessed by a plurality of clients 320 (e.g., clients 320-1, 320-2, ..., 320-N), such as client machines 116, 117, or 122 in FIG. 1. Each server node 310 comprises its own central processing unit (CPU) and memory, and all nodes in the cluster can communicate with each other, such as through one or more private interconnects 360.

The shared disk storage 340 is part of a cluster database 330 and can comprise multiple disks. In some example embodiments, the server nodes 310 jointly manage a single installation of the databases on the shared disk storage 340. In some example embodiments, the cluster database 330 also includes a quorum disk 350. The quorum disk 350 is a shared disk device used for cluster membership arbitration and maintaining a history of run time cluster view changes.

As seen in FIG. 4, in some example embodiments, the shared disk storage 340 comprises any combination of one or more of a data management module 410, a user database (DB) 420, a lock information database 430, and a master database 440. In some example embodiments, the data management module 410 is configured to communicate with the server nodes 310, such as to receive instructions from the server nodes 310 to perform operations (e.g., read, write, etc.) on the databases (e.g., user DB 420, lock information DB 430, master DB 440) on the shared disk storage 340. In some example embodiments, the server nodes 310 each comprise their own corresponding data management module 410 that is configured to perform operations (e.g., read, write, etc.) on the databases (e.g., user DB 420, lock information DB 430, master DB 440) on the shared disk storage 340.

The user database 420 can comprise a plurality of data items, which can be accessed by the cluster of server nodes 310. The cluster of server nodes 310 can perform database operations on the user database 420. Such database operations can comprise database read/write operations. Database write operations are operations that create or modify data in a database, such as data manipulation language (DML) write operations (e.g., INSERT, UPDATE, DELETE). These operations, or transactions, can be performed from each server node 310. In some example embodiments, the user database 420 comprises a transactional database configured to support user database transactions, with each user database transaction comprising one or more DML statements or queries, and the write transactions on the user database 420 can be rolled back if they are not completed properly (e.g., due to power or connectivity loss).

In some example embodiments, the SDC architecture 300 employs concurrency control mechanisms to make sure that the data items dirtied by a transaction at one server node 310 will not be visible by another transaction or reader, at the same node as well as at other nodes, until the transaction is completed, either committed or rolled-back. Such concurrency control mechanisms can include transaction locks.

A lock, such as a read lock or write lock, is used when multiple server nodes 310 need to access a database concurrently. A lock prevents the data from being used when multiple nodes 310 try to read or write while other threads (at the same node 310 or at other nodes 310) modify/write the data item. Any single node 310 can only modify those database records (e.g., data items in the database) to which they have applied a lock that gives them exclusive access to the record until the lock is released. When a node 310 wants to modify data in the user database 420, the node 310 acquires a lock on that data. With cluster locks and local locks, every node stores its own local lock records associated with the transactions initiated by the current node and cluster locks associated with transactions initiated at the current node as well as at other nodes in the distributed system. Cluster locks are managed by a lock master which is chosen based on some heuristics.

Each node 310 can manage one or more cluster locks, which can then be acquired from that node 310 by other nodes 310. Generally, nodes 310 cannot see the locks managed by other nodes 310. In some example embodiments, the SDC architecture 300 employs cluster locks. A cluster lock is a node level lock associated with a data item in the distributed database where the transaction has to acquire the node level lock (cluster lock) before acquiring the local lock for accessing/manipulating the data item. Each data item may have a lock master. A lock master for a data item is a node 310 in the distributed database system that manages/synchronizes operations on the data item across the nodes 310 in the distributed database system on the data item. Any node 310 trying to access/manipulate the data item needs to queue a lock at the lock master before accessing the data item.

A node 310 can manage a cluster lock for a particular location (e.g., a particular row) in the user database 420 such that any other node 310 that wants to perform a database write operation for that particular location in the user database 420 needs to acquire the corresponding cluster lock from the node 310 managing the cluster lock. The node 310 managing the cluster lock manages a record of the requesting node 310 having acquired the lock, such that subsequent requesting nodes 310 will be denied the lock by the managing node 310 based on the managing node 310 determining that the previous requesting node 310 still is using the lock. This record of which nodes 310 have which locks can be used to determine what data items have incomplete transactions in cased of a node failover event. However, it is possible that the node 310 managing a cluster lock may also experience a failover event. The lock information can be replicated to other nodes 310 in the cluster to ensure its accessibility. In some example embodiments, every granted cluster lock is replicated and stored in multiple server nodes to detect the uncommitted data items during the failover recovery. Lock replication at a different node is useful to detect the active/uncommitted data items and restrict the access to it in case of failures. In some example embodiments, in case of a failover recovery event, the ownership information associated with the cluster locks along with replicated locks and local lock records are used to determine the data items that are associated with the incomplete transaction(s) in the failed node.

Lock replication can be expensive. In some example embodiments, the SDC architecture 300 does not employ lock replication among the cluster of nodes 310, but rather stores the lock information in a lock information database, such as the lock information database 430 in the server node 310, as shown in FIG. 4. In some example embodiments, each server node 310 has its own lock information database 430 that is accessible to all of the other nodes 310 in the cluster, but which can only be written to by that node 310, such that no cluster level activities are performed on this lock information database 430. In some example embodiments, the lock information database 430 is a node-local database of a corresponding server node 310, and that corresponding server node 310 is the only node (e.g., the only node in the cluster of nodes) able to write to the lock information database 430, with the other nodes (e.g., the nodes other than that corresponding node) being able to read from the lock information database during a failover event for that corresponding node. In some example embodiments, each node 310 has its own corresponding region of lock information database 430 that is accessible to all of the other nodes 310 in the cluster, but which can only be written to by that node 310, such that no cluster level activities are performed on this corresponding region of lock information database 430. The master database 440 can store information about the other databases in the distributed database system (e.g., a record of all of the user databases 420 and lock information databases 430).

In some example embodiments, for any lock being requested from a transaction in a node 320, a lock request entry for corresponding lock information can be generated by the corresponding server node 310 and included in a node local file, such as a lock request file 500 in FIG. 5. The lock request entry can be maintained in-memory on the server node 310 until it is written to disk on the shared disk storage 340. In some example embodiments, the lock information comprises transaction-specific information for each transaction, such as a corresponding user transaction identifier 510, corresponding transaction status information 520, and corresponding lock request entries 530 (e.g., lock request entry 530-1, lock request entry 530-2, . . . , lock request entry 530-N). This lock information can be stored in the form of a record, which can be fixed size and can be written without using latches (e.g., allocating the next free offset and updating the offset using a compare-and-swap instruction).

In some example embodiments, each lock request entry 530 comprises an identification of a location of the data item being transacted upon in the user database 420 by the requested operation. Such an identification can comprise any combination of one or more of a database identification 532, a page identification 534, and a row identification 536 corresponding to the requested operation. Additionally, each lock request entry 530 can also comprise an identification of a lock type 538 of the corresponding lock to be acquired for the requested operation.

In some example embodiments, the lock request file 500 can be truncated and re-used as part of a post-commit operation (e.g., once the transaction is completed, then it can be truncated and moved to a free queue asynchronously by using the transaction status information 530.

In some example embodiments, the in-memory lock information is written to disk (e.g., the lock information DB 430 on the shared disk storage 340) before the user transaction log record (stored and managed in the user DB 420) is sent (e.g., written) to the disk in a separate internal transaction (e.g., lock tracking entries are persisted to disk before their associated user transaction log records goes to the disk). This will ensure that the failover node will see the lock information associated with any incomplete transactions associated with a data item in the flushed transaction log record.

The internal transaction used to write the lock information to the disk should be optimal and should not impact the throughput of the user database 420. In order to achieve this, in some example embodiments, the internal transaction only logs the space allocated (e.g., page) for storing/persisting the lock information, not the actual lock information data. The in-memory lock information is written to allocated space before writing the user transaction log record into the disk. All the space (e.g., pages) allocated by internal transactions are linked together to have better access by the failover node or by a garbage collection thread that reclaims the space.

FIG. 6 illustrates information 610 logged by an internal transaction that stores lock information along with user transaction log records 620, in accordance with some example embodiments. The user transaction log records 620 identify the requested operations. The information 610 identifies allocated space for lock request entries 530 that correspond to the requested operations of the user transaction log records 620. In the example provided in FIG. 6, a user transaction begins, and database operations are performed and logged. First, an insert operation is performed on row five ("INSERT R5"), and a corresponding transaction lock is acquired for this insert operation on row five. Next, a delete operation is performed on row two ("DELETE R2"), and a corresponding transaction lock is acquired for this delete operation. This corresponding activity between database operations and acquisition of transaction locks is repeated until the transaction is complete.

In some example embodiments, the lock request file 500 is persisted on the shared disk storage 340 and is accessible to all of the nodes 310 in the cluster. At the same time, minimal protocols can be employed to write the data to these lock request files 500 without any need for cluster level physical locks because this lock request file 500 is a transaction private file in local temporary storage and is accessible to all of the nodes 310 in the cluster. In some example embodiments, the changes to these lock request files 510 is logged to enable the recovery of the lock request files 500 associated with uncommitted transactions of a failed node 310 (e.g., a node 310 that has crashed). These lock request files 500 can also be persisted as part of a check-point to reduce the recovery time.

In some example embodiments, asynchronous cleanup of the lock request files 500 is employed. This asynchronous cleanup can comprise a garbage collection thread that removes the space allocated to the lock request file 500 and moves the lock request file 500 back to a free list if the corresponding status 520 indicates that the transaction has been completed (e.g., committed or rolled-back). Any lock request file 500 in the free list can be used by other transactions in the node 310.

Runtime activities can be performed on the lock request file 500. In some example embodiments, a transaction manager on the node 310 or as part of the data management module 410, allocates a lock request file 500 from the reserved free file list. If there is no free file, then the transaction manager allocates a lock request file 500 from the reserved storage of the node 310. The allocated lock request file 500 can be updated with the transaction information.

Database threads performing the data changes can use transaction locks as concurrency control mechanisms. If the transaction uses locks, then the database thread can insert its lock request entry 530 into the lock request file 500 after acquiring the lock, which can involve a cluster level lock as well as the node level transaction lock without any lock replication to other nodes 310. The insert into the lock request file 500 can be implemented as a short transaction or can be part of the same user transaction or in some internal transaction which covers all the lock requests associated with a transaction. In some example embodiments, the record in the lock request file 500 should be persisted on the shared disk storage 340 before the log records associated with the user transaction are persisted to the disk. Once the entry is recorded and persisted, then the database thread can continue its execution.

At the time of transaction completion (e.g., commitment), if synchronous cleanup is employed, then the lock request file 500 can be truncated and marked for re-use or the lock request file 500 can be queued to a garbage collection thread after updating the status 530 of the transaction in the lock request file 500, which can move the lock request file 500 to a free list for its re-use. In some example embodiment, all of the activities associated with the lock request file 500 are local activities with no need for any cluster level protocols. However, in some example embodiments, the lock request file 500 is available to other nodes 310 in the cluster for recovering lock request files 500 and rebuilding the identities of the uncommitted data items associated with the transactions at the failed node 310.

In one example of node failover recovery, N1 is a failed node and N2 is a node that is recovering the failed node N1. Here, N2 identifies the corresponding file region in lock information database 430 for N1 and recovers the lock request files 500 associated with N1. N2 reads the contents of the lock request files 500 and instantiates the locks based on the lock request files 500 to prevent other nodes from accessing the corresponding data items or locations in user database 420 until a point in the node failover recovery (e.g., until a redo phase). After the locks are instantiated, the physical node recovery is performed to clean the uncommitted transactions. Once the node recovery is completed, then all of the lock request files 500 associated with the failed node 310 can be truncated.

The speed of run-time activity can be increased. In order to reduce the impact of the temporary transactions recording the entries in the lock request file 500, advancements in memory/disks can be utilized, such as by using solid-state drives (SSDs) or non-volatile memory for storing the lock request file 500, which perform much closer to in-memory execution.

In some example embodiments, the features disclosed herein can be implemented using tables (e.g., a node-specific table in shared disk cluster storage). One approach is to have a small database for every node with a table or tables containing the contents of the lock request file 500. In some example embodiments, this small database is used only at one node (e.g., a database created for node-2 is used only by tasks at node 2 and hence no cluster level lock, buffer, or object content mapping management is required for these tables. At the same time, this database can be recovered in the event of a node failure by another node. This table can be truncated periodically based on the completed transaction information. Another approach is to have a table per transaction and drop it as part of a commitment of the transaction.

In another example embodiment, a table in the lock information database 430 is used for the node to track only the lock information and update it as part of the transaction. All of the operations on this table can be local operations.

Figure 7:
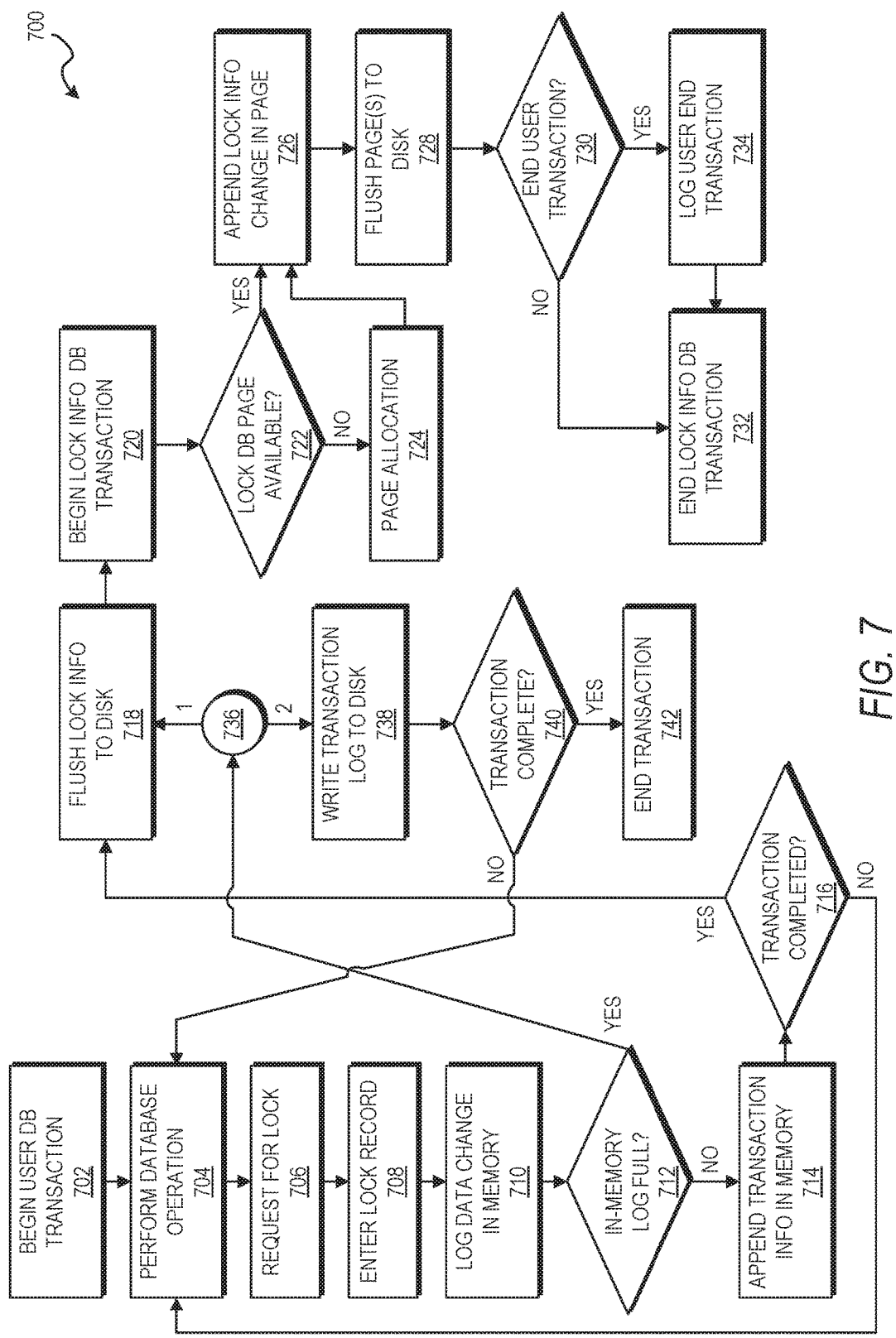
FIG. 7 is a flowchart illustrating a method of failover recovery, in accordance with some example embodiments.

FIG. 7 is a flowchart illustrating a method 700 of data management, in accordance with some example embodiments. Method 700 can be performed by processing logic that can comprise hardware (e.g., circuitry, dedicated logic, programmable logic, microcode, etc.), software (e.g., instructions run on a processing device), or a combination thereof. In one example embodiment, the method 700 is performed by the distributed database management system of the present disclosure, such as by one or more of the server nodes 310 of FIG. 3.

At operation 702, a user database transaction is initiated at a node 310. At operation 704, a database operation is performed on the user database at the node 310. In some example embodiments, the database operation comprises a database write operation (e.g., a DML INSERT, DELETE, or MODIFY operation). At operation 706, a lock is requested and acquired, from a corresponding lock master, for the database operation by the node 310. At operation 708, a corresponding lock request entry for the requested lock is inserted in-memory by the node 310, such as in the lock information database. The lock request entry can be stored as part of a lock request file, as previously discussed. At operation 710, the change of data corresponding to the database operation is logged in-memory by the node 310.

At operation 712, the node 310 determines whether or not its in-memory log is full. If it is determined that the in-memory log is not full, then the node 310 appends the transaction information in-memory at operation 714. At operation 716, it is determined if the user transaction is complete. If it is determined that the user transaction is not complete, then the method 700 returns to operation 704, where another database operation is performed. If it is determined that the transaction is complete, then the node 310 flushes the lock information to the shared disk storage at operation 718.

At operation 720, a lock database transaction is initiated. At operation 722, it is determined whether a page for a lock request file is available. If it is determined that a page is available, then the change in lock information is appended to an available page at operation 726. If it is determined that a page is not available, then a page is allocated at operation 724, and then the change in lock information is appended to the allocated page at operation 726. At operation 728, the page is flushed to the shared disk storage 728. At operation 730, it is determined whether the user database transaction has ended. If it is determined that the user database transaction has not ended, then the lock database operation is ended at operation 732. If it is determined that the user database transaction has ended, then the end of the user database transaction is logged at operation 734.

Referring back to operation 712, if it is determined that the in-memory log is full, then the method 700 proceeds to operation 736. At operation 736, first, the lock information is flushed to the shared disk storage at operation 718, as previously discussed. After then lock information is flushed to the shared disk storage, then the transaction log is written to the shared disk storage at operation 738. At operation 740, it is then determined whether the user database transaction is complete. If it is determined that the user database transaction is not complete, then the method returns to operation 704, where another database operation is performed. If it is determined that the user database transaction is complete, then the user database transaction is ended at operation 742.

It is contemplated that any of the other features described within the present disclosure can be incorporated into method 700.

Figure 8:
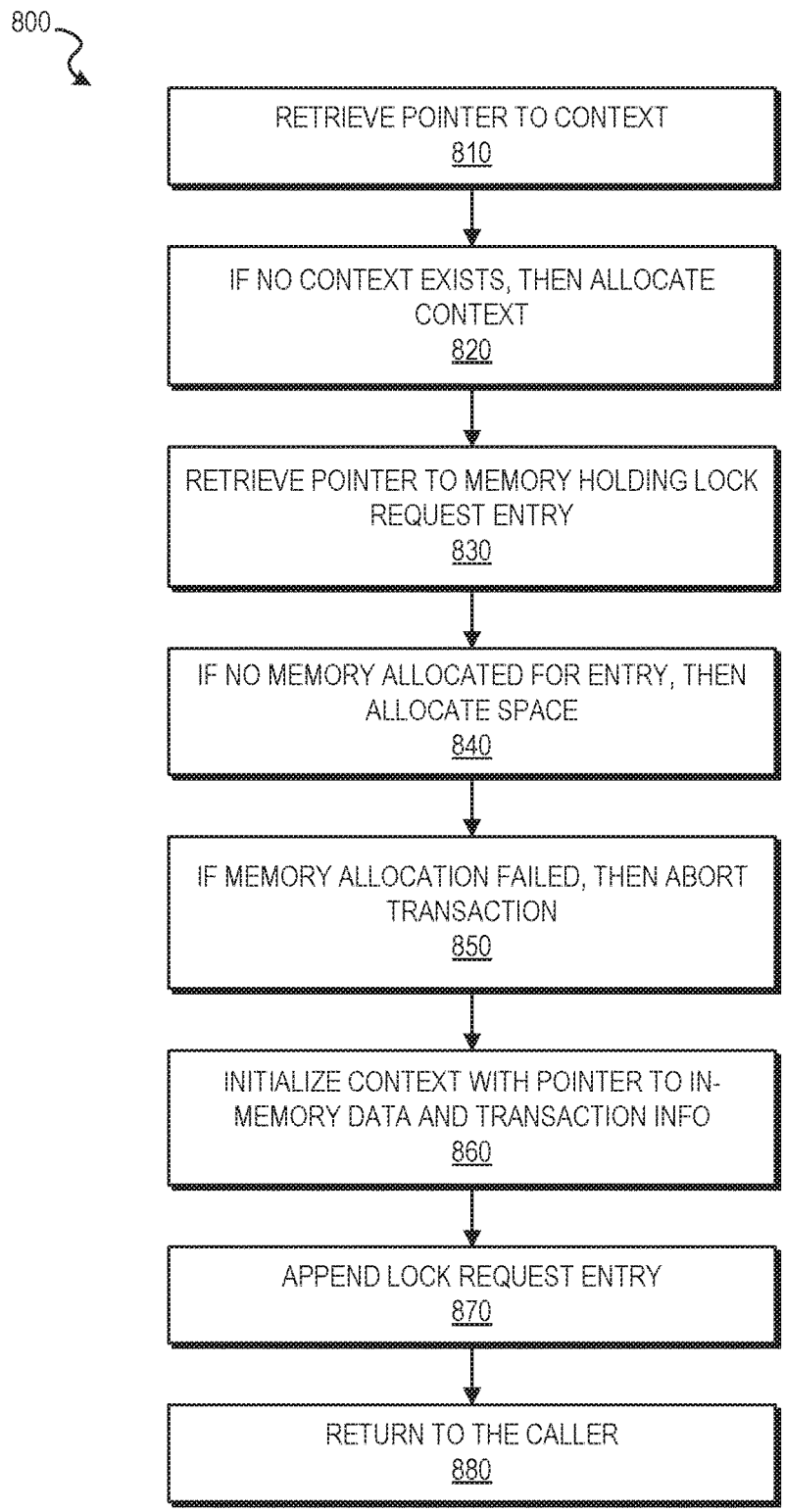
FIG. 8 is a flowchart illustrating a method of inserting a lock request entry in a lock information database, in accordance with some example embodiments.

FIG. 8 is a flowchart illustrating a method 800 of inserting a lock request entry in a lock information database, in accordance with some example embodiments. Method 800 can be performed by processing logic that can comprise hardware (e.g., circuitry, dedicated logic, programmable logic, microcode, etc.), software (e.g., instructions run on a processing device), or a combination thereof. In one example embodiment, the method 800 is performed by the distributed database management system of the present disclosure, such as by one or more of the server nodes 310 of FIG. 3.

At operation 810, a pointer to a lock request file context is retrieved from a transaction descriptor. In some example embodiments, the lock request file context comprises the lock information discussed above and is exemplified by the following example pseudo-code:

```
LockInfoContext {
    void    *ltc_lockreqentries;
    pgid_t  ltc_firstpage;
    pgid_t  ltc_currentpage;
    BUF     *ltc_curbp;
    XDES    *ltc_ltdb_xdes;
};
LockReqEntry {
    dbid_t   lre_dbid;
    objid_t  lre_objid;
    ptnid_t  lre_ptnid;
    pgid_t   lre_pgno;
    int16    lre_rno;
    int16    lre_type; // BYTE?
};
```

At operation 820, if it is determined that no lock request file context exists, then a lock request file context is allocated. At operation 830, the pointer to memory holding the in-memory lock request entry is retrieved. At operation 840, if it is determined that no memory is allocated for in-memory lock request entries, then space for the same is allocated (e.g., the size of the memory block is bounded by the size of the in-memory log). At operation 850, if it is determined that any of the memory allocation is failed, then the transaction is aborted. At operation 860, the lock request file context information is initialized with the pointer to the in-memory data and transaction information. At operation 870, the lock request entry holding lock information (e.g., DB ID, object ID, page ID, row ID, lock type) is appended in-memory. At operation 880, a return is made to the caller function.

It is contemplated that any of the other features described within the present disclosure can be incorporated into method 800.

Figure 9:
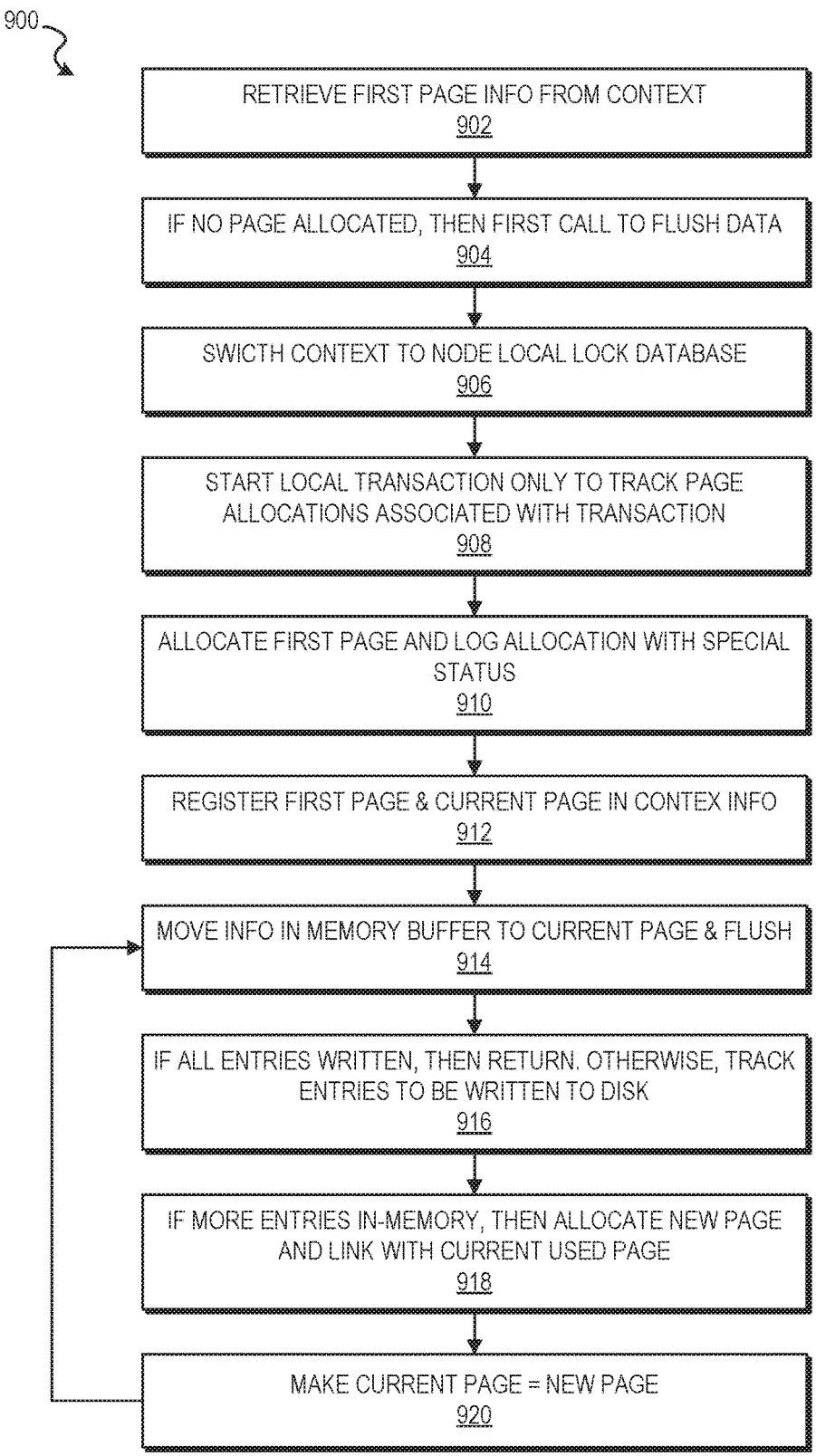
FIG. 9 is a flowchart illustrating a method of flushing a lock request entry to disk, in accordance with some example embodiments.

FIG. 9 is a flowchart illustrating a method 900 of flushing a lock request entry to disk, in accordance with some example embodiments. Method 900 can be performed by processing logic that can comprise hardware (e.g., circuitry, dedicated logic, programmable logic, microcode, etc.), software (e.g., instructions run on a processing device), or a combination thereof. In one example embodiment, the method 900 is performed by the distributed database management system of the present disclosure, such as by one or more of the server nodes 310 of FIG. 3.

At operation 902, the first page information is retrieved from lock request file context. At operation 904, if it is determined that there is no page allocated yet, then it is determined that this is the first call to flush the in-memory data to disk. At operation 906, the context is switched to the node local lock information database. At operation 908, a local transaction is started only to track the page allocations associated with the transaction. At operation 910, the first page is allocated, and the page allocation is logged with special status to mention that this is the first page of lock request entries. At operation 912, the first page and the current page are registered in the lock request file context information (e.g., hanging from the user transaction). At operation 914, the information in the in-memory buffer is moved to the current page, and the page is flushed to the disk. At operation 916, if it is determined that all entries are written then the method returns. Otherwise, the entries that needs to be written to the disk are tracked. At operation 918, if it is determined that there are more entries in-memory, then a new page is allocated and linked with the current used page. At operation 920, a new page is assigned to be the current page (e.g., update current page of the lock request file context information). The method 900 then returns to operation 914.

It is contemplated that any of the other features described within the present disclosure can be incorporated into method 900.

Figure 10:
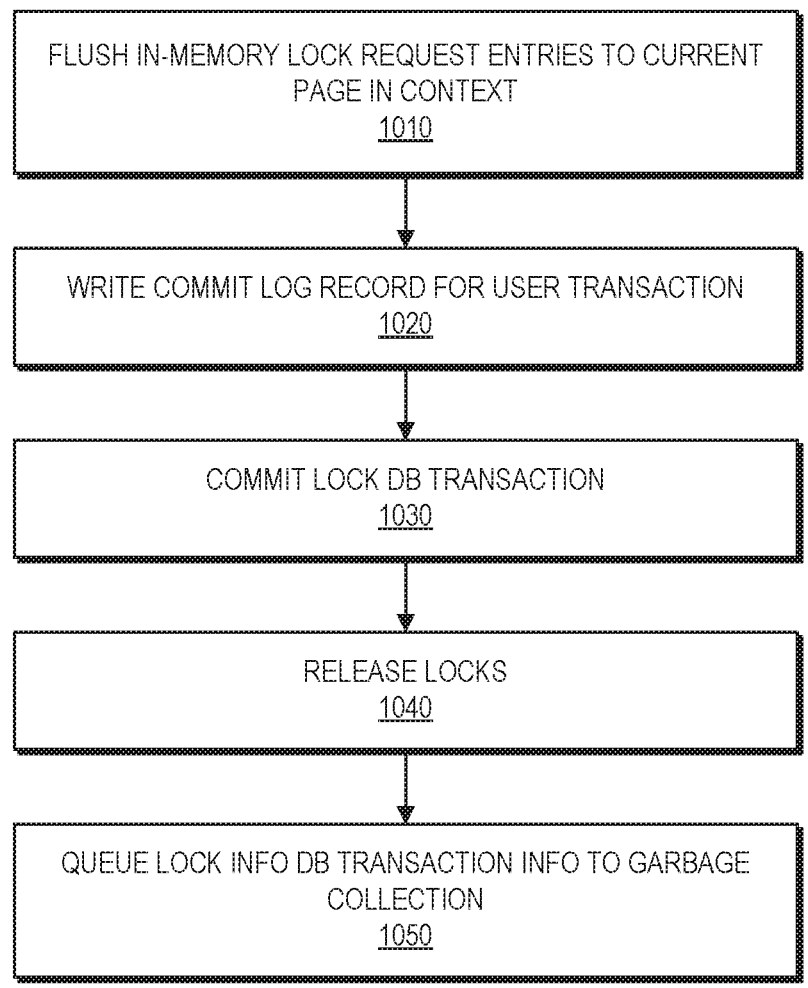
FIG. 10 is a flowchart illustrating a method of handling a commit/rollback stage of a failover recovery, in accordance with some example embodiments.

FIG. 10 is a flowchart illustrating a method 1000 of handling a commit/rollback stage of a failover recovery, in accordance with some example embodiments. Method 1000 can be performed by processing logic that can comprise hardware (e.g., circuitry, dedicated logic, programmable logic, microcode, etc.), software (e.g., instructions run on a processing device), or a combination thereof. In one example embodiment, the method 1000 is performed by the distributed database management system of the present disclosure, such as by one or more of the server nodes 310 of FIG. 3.

At operation 1010, before flushing the in-memory log, all in-memory lock request entries are flushed to the current page in the lock request file context. If it is determined that the current page cannot accommodate the in-memory information, then a new page is allocated and the remaining entries are written into the newly allocated page. At operation 1020, the commit log record is written for the user database transaction. At operation 1030, the lock database transaction is committed. This operation can be used for skipping the lock re-instantiation while performing the node fail-over recovery. At operation 1040, the locks are released. At operation 1050, the lock request entry database information is queued to garbage collection. The garbage collection thread can use the first page information in the lock request file context and de-allocate all of the pages associated with the transaction.

It is contemplated that any of the other features described within the present disclosure can be incorporated into method 1000.

The following pseudo-code provides one example of a structure holding a queue element for garbage collection:

```
LockInfoTranEntry {
    LINK ltc_link;
    pgid_t ltc_firstpage;
};
```

In some example embodiments, one thread per node is spawned for reclaiming the pages used for lock request entry information. All the user transactions can queue lock request file context information to a garbage collection thread, such as LockInfoGCQueue. Garbage collection threads can read entries from LockInfoGCQueue. A transaction can be started, and all of the pages associated with the lock request file context information can be deallocated (e.g., as all of the pages are linked, the garage collection thread can read all of the pages using first page information). The transaction can be committed before moving to next element in the queue. As an optimization, the garbage collection thread can be enhanced to process multiple elements in one single transaction.

Figure 11:
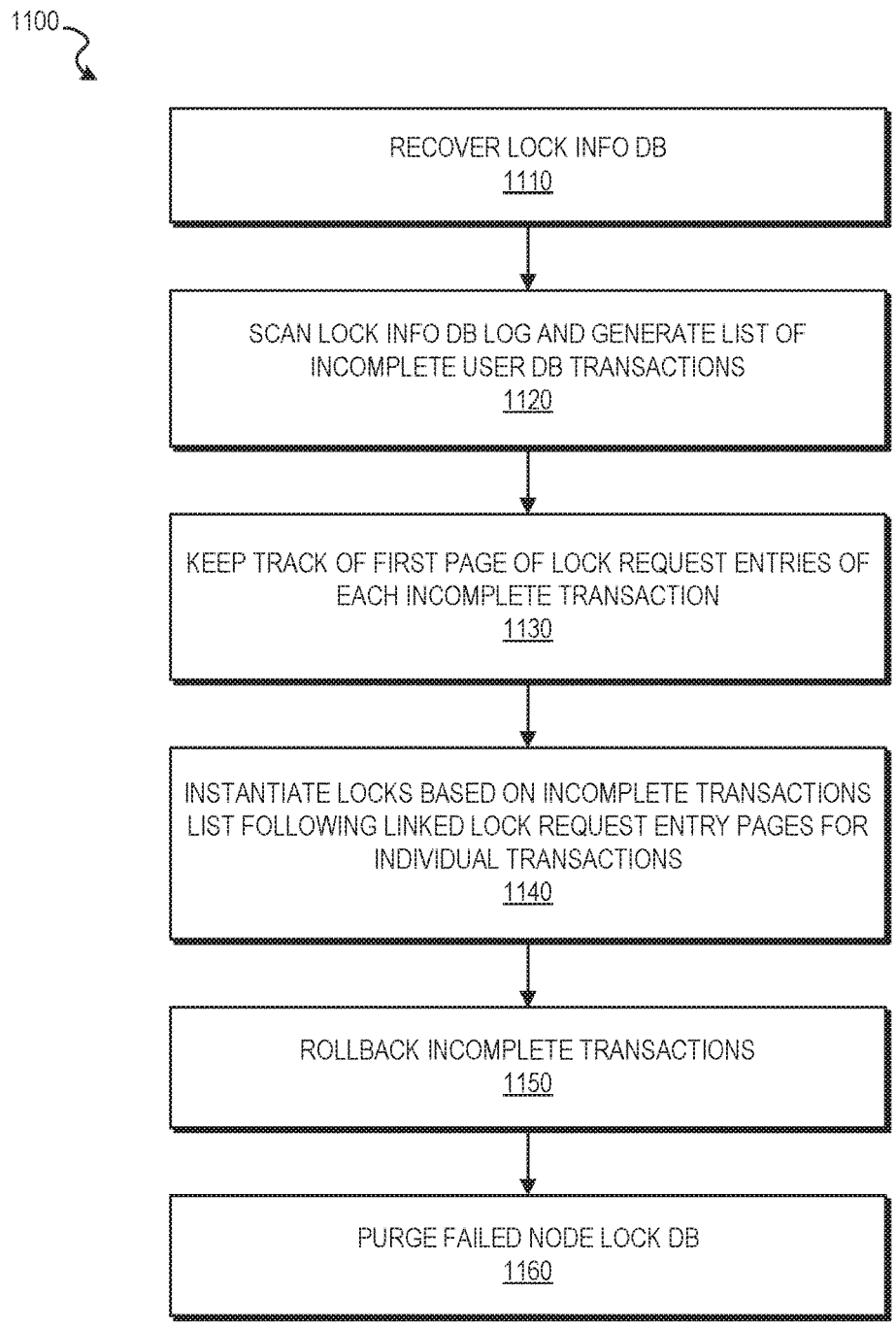
FIG. 11 is a flowchart illustrating a method of failover recovery, in accordance with some example embodiments.

FIG. 11 is a flowchart illustrating a method 1100 of failover recovery, in accordance with some example embodiments. Method 1100 can be performed by processing logic that can comprise hardware (e.g., circuitry, dedicated logic, programmable logic, microcode, etc.), software (e.g., instructions run on a processing device), or a combination thereof. In one example embodiment, the method 1100 is performed by the distributed database management system of the present disclosure, such as by one or more of the server nodes 310 of FIG. 3.

At operation 1110, the lock information database is recovered. At operation 1120, during an analysis phase, the lock information database log is scanned and a list of incomplete user database transactions is generated (e.g., based on the corresponding status information). At operation 1130, the first page of lock request entries of each incomplete transaction is tracked. At operation 1140, during a redo phase, locks are instantiated based on the incomplete transaction list following all the linked lock request entry pages for individual transactions. At operation 1150, during an undo phase, incomplete transactions are rolled back. In some example embodiments, sp_dbrecovery is used to fix the order of the database recovery. At operation 1160, after the node failover recovery, the lock information database of the failed node is purged.

It is contemplated that any of the other features described within the present disclosure can be incorporated into method 1100.

Figure 12:
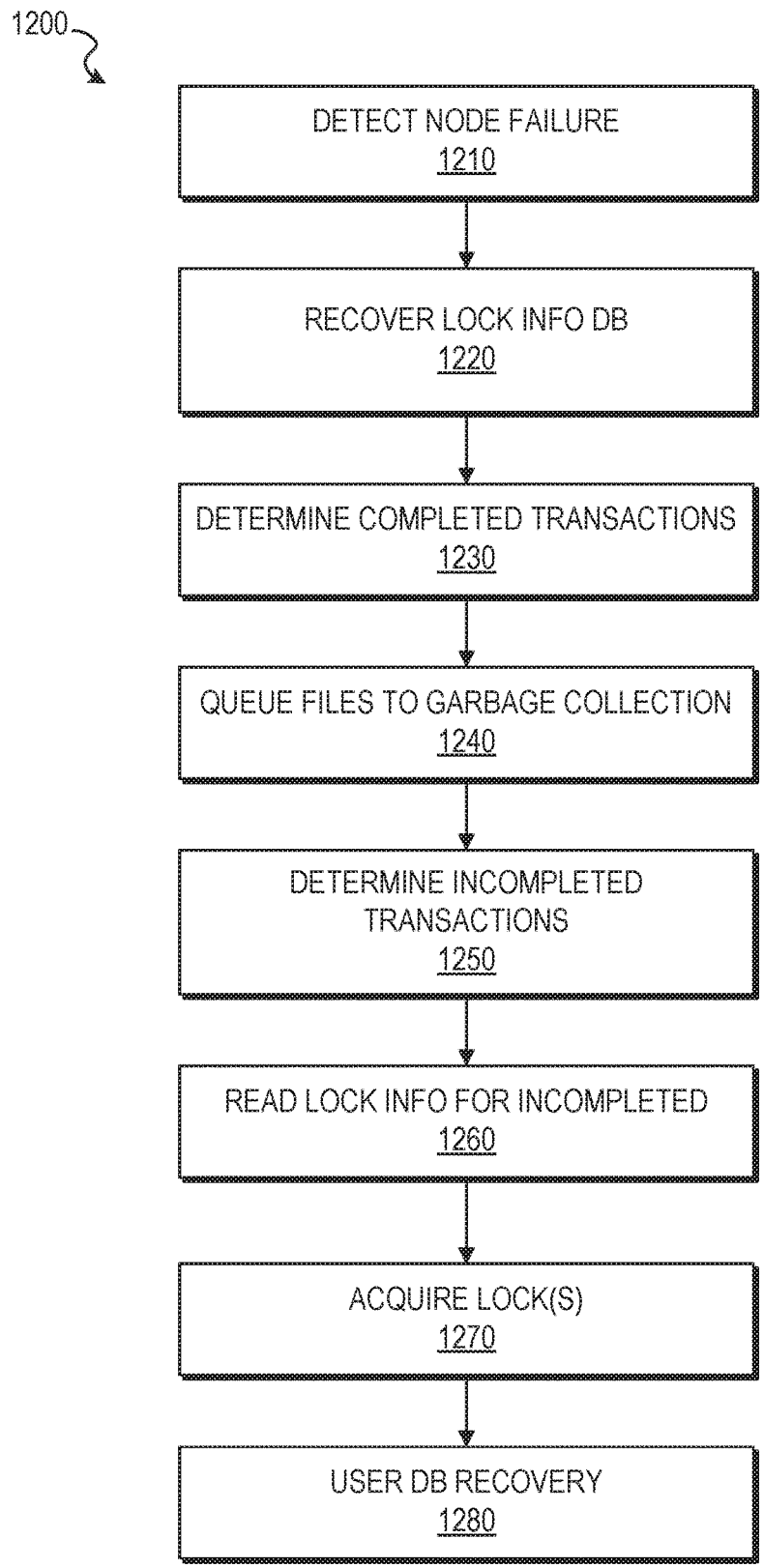
FIG. 12 is a flowchart illustrating a method of failover recovery, in accordance with some example embodiments.

FIG. 12 is a flowchart illustrating a method 1200 of failover recovery, in accordance with some example embodiments. Method 1200 can be performed by processing logic that can comprise hardware (e.g., circuitry, dedicated logic, programmable logic, microcode, etc.), software (e.g., instructions run on a processing device), or a combination thereof. In one example embodiment, the method 1200 is performed by the distributed database management system of the present disclosure, such as by one or more of the server nodes 310 of FIG. 3.

At operation 1210, a failover event (e.g., a node crash) for a first node is detected. At operation 1220, the file(s) associated with the first node in a lock information database in a shared disk is recovered and accessed by a second node based on the detection of the failover event. In some example embodiments, a transaction log in the shared disk is also accessed by the second node based on the detection of the failover event. At operation 1230, the second node determines the completed transactions based on the status indications for the transactions in the file(s) associated with the first node in the lock information database. At operation 1240, the file(s) corresponding to the determined completed transactions are queued to garbage collection. At operation 1250, the second node determines the incomplete transactions based on the status indications for the transactions in the file(s) associated with the first node in the lock information database. At operation 1260, the second node reads the corresponding lock information for the incomplete transactions. At operation 1270, the second node acquires the transaction lock(s) corresponding to the data item(s) in a user database on a shared disk associated with the determined incomplete transactions. At operation 1280, the second node performs a recovery of the user database using the acquired transaction lock(s), undoing the corresponding incomplete database write operation(s).

It is contemplated that any of the other features described within the present disclosure can be incorporated into method 1200.

The technical solutions disclosed herein provided several advantages over the current state of the art. One technical advantage is the elimination of cluster level redundancy and the need to replicate multiple lock object copies in order to support multiple simultaneous node failure. As the file 500 persists on the shared disk 314, any chosen node 320 can perform the failover recovery. This failover recovery can be performed until the last active node.

Another technical advantage is that the current solutions support only simultaneous failure by having higher cluster redundancy level and do not support subsequent failures. Subsequent failure is when a node performing the failover rebuild and recovery also fails, which results in the entire cluster going down. In contrast, the file 500 of the present disclosure can be used until the last active node performs lock space rebuild and recovery.

Yet another technical advantage is that, in the current solutions, a directory service replicates as many lock copies as specified by a cluster redundancy level. In contrast, using the features of the present disclosure, replication work done by the directory service can be eliminated and the directory service can act just as a map providing information about the location of a lock master for a given resource.

It is contemplated that any features of any embodiments disclosed herein can be combined with any other features of any other embodiments disclosed herein. Accordingly, these any such hybrid embodiments are within the scope of the present disclosure.

Figure 13:
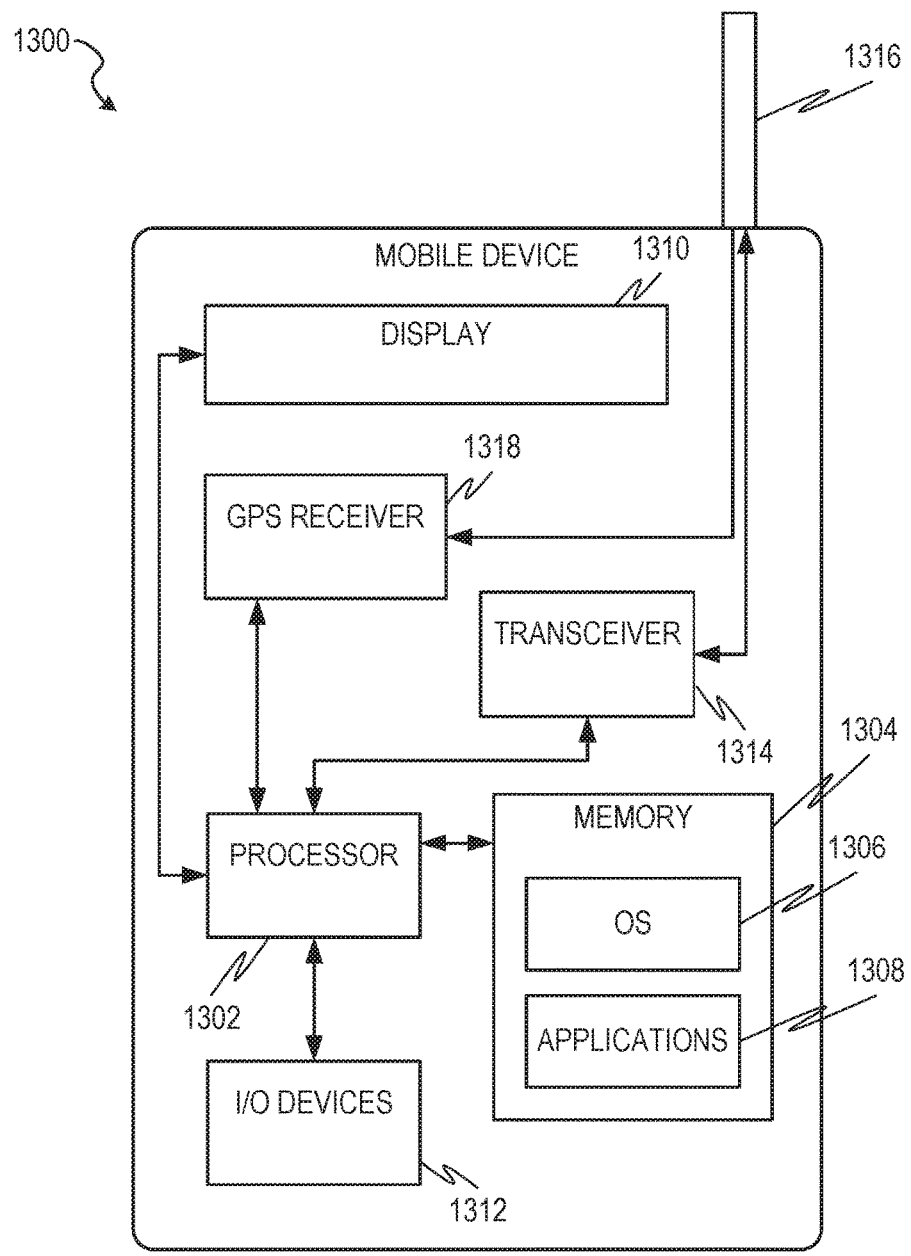
FIG. 13 is a block diagram illustrating a mobile device, in accordance with some example embodiments.

FIG. 13 is a block diagram illustrating a mobile device 1300, in accordance with some example embodiments. The mobile device 1300 can include a processor 1302. The processor 1302 can be any of a variety of different types of commercially available processors suitable for mobile devices 1300 (for example, an XScale architecture microprocessor, a Microprocessor without Interlocked Pipeline Stages (MIPS) architecture processor, or another type of processor). A memory 1304, such as a random access memory (RAM), a Flash memory, or other type of memory, is typically accessible to the processor 1302. The memory 1304 can be adapted to store an operating system (OS) 1306, as well as application programs 1308, such as a mobile location enabled application that can provide LBSs to a user. The processor 1302 can be coupled, either directly or via appropriate intermediary hardware, to a display 1310 and to one or more input/output (I/O) devices 1312, such as a keypad, a touch panel sensor, a microphone, and the like. Similarly, in some example embodiments, the processor 1302 can be coupled to a transceiver 1314 that interfaces with an antenna 1316. The transceiver 1314 can be configured to both transmit and receive cellular network signals, wireless data signals, or other types of signals via the antenna 1316, depending on the nature of the mobile device 1300. Further, in some configurations, a GPS receiver 1318 can also make use of the antenna 1316 to receive GPS signals.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 14:
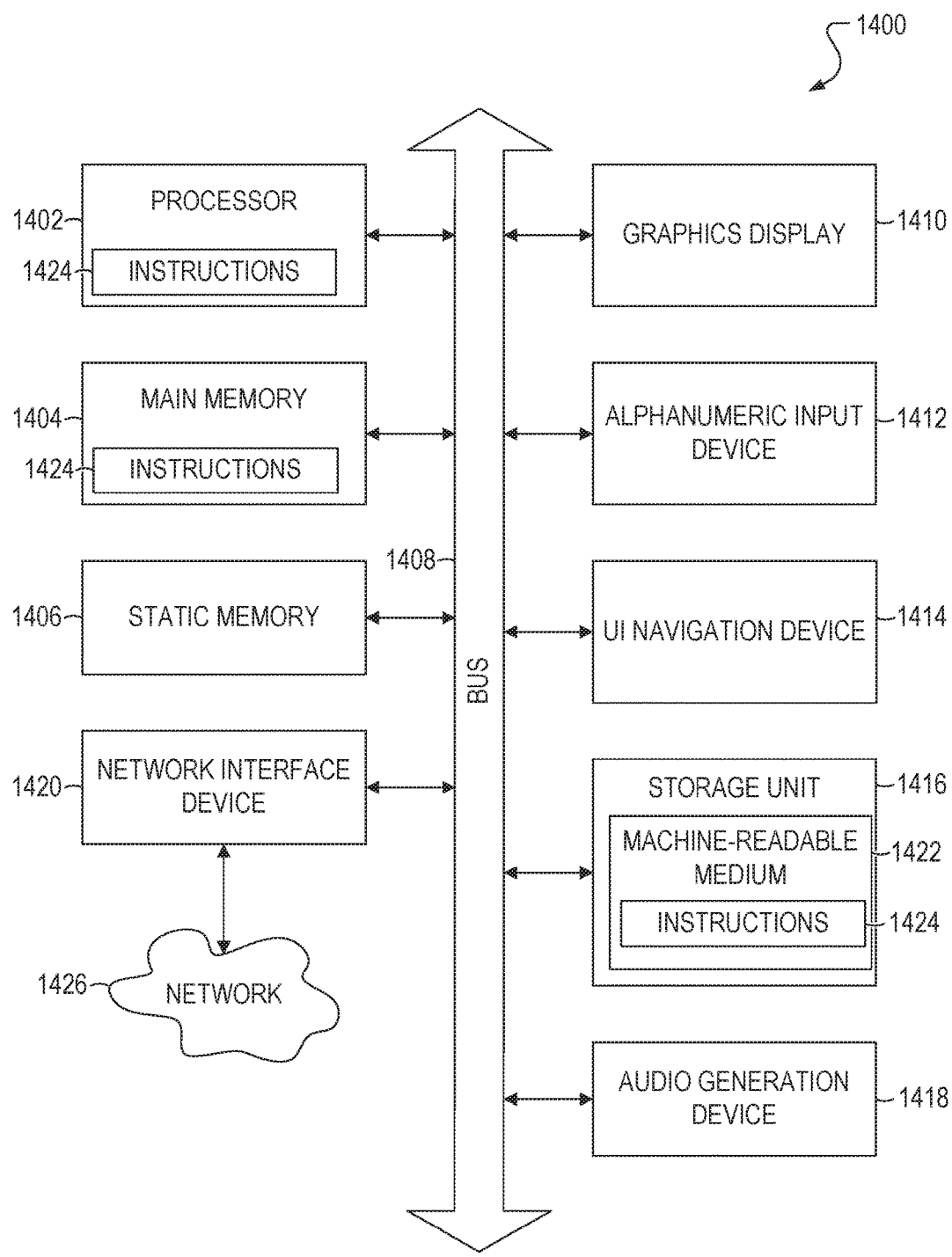
FIG. 14 is a block diagram of an example computer system on which methodologies described herein can be executed, in accordance with some example embodiments.

FIG. 14 is a block diagram of a machine in the example form of a computer system 1400 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU) or both), a main memory 1404 and a static memory 1406, which communicate with each other via a bus 1408. The computer system 1400 may further include a graphics or video display unit 1410 (e.g., a liquid crystal display (LCD) or a cathode ray tube (CRT)). The computer system 1400 also includes an alphanumeric input device 1412 (e.g., a keyboard), a user interface (UI) navigation (or cursor control) device 1414 (e.g., a mouse), a storage unit (e.g., a disk drive unit) 1416, an audio or signal generation device 1418 (e.g., a speaker), and a network interface device 1420.

The storage unit 1416 includes a machine-readable medium 1422 on which is stored one or more sets of data structures and instructions 1424 (e.g., software) embodying or utilized by any one or more of the methodologies or functions described herein. The instructions 1424 may also reside, completely or at least partially, within the main memory 1404 and/or within the processor 1402 during execution thereof by the computer system 1400, the main memory 1404 and the processor 1402 also constituting machine-readable media. The instructions 1424 may also reside, completely or at least partially, within the static memory 1406.

While the machine-readable medium 1422 is shown in an example embodiment to be a single medium, the term "machine-readable medium" may include a single medium or multiple media (e.g., a centralized or distributed database, and/or associated caches and servers) that store the one or more instructions 1424 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks; magneto-optical disks; and compact disc-read-only memory (CD-ROM) and digital versatile disc (or digital video disc) read-only memory (DVD-ROM) disks.

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for selective gesture interaction using spatial volumes. Representative examples utilizing many of these additional features and teachings, both separately and in combination, are described in further detail with reference to the attached figures. This detailed description is merely intended to teach a person of skill in the art further details for practicing preferred aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
receiving, by a first node of a plurality of nodes in a distributed database system on a shared disk cluster infrastructure, a transaction request to perform a user database transaction on one or more data items in a user database on a shared disk on the shared disk cluster infrastructure, the user database transaction comprising one or more database write operations for the one or more data items in the user database, and the shared disk being accessible by the plurality of nodes;
acquiring, by the first node, a corresponding transaction lock for each one of the one or more data items of the user database transaction;
storing, by at least one processor, a lock file for the user database transaction in a lock information database on the shared disk, the lock information database being a node-local database of the first node, the first node being the only node in the plurality of nodes able to write to the lock information database, the plurality of nodes other than the first node being able to read from the lock information database during a failover event for the first node, the lock file comprising corresponding lock information for each transaction lock of the user database transaction and an indication of a status of the user database transaction, and the corresponding lock information comprising an identification of a location of the corresponding data item for each corresponding transaction lock; and
storing, by the at least one processor, a transaction record of the user database transaction in a transaction log in the user database on the shared disk subsequent to the storing of the lock file in the lock information database on the shared disk.

2. The method of claim 1, further comprising:
detecting a failover event for the first node;
accessing, by a second node of the plurality of nodes, the lock file in the lock information database of the first node on the shared disk based on the detecting the failover event;
determining, by the second node, that the user database transaction is incomplete based on the indication of the status in the accessed lock file;
acquiring, by the second node, each corresponding transaction lock for the one or more data items of the user database transaction based on the determination that the user database transaction is incomplete, causing the second node to be the only node in the plurality of nodes able to access the one or more data items in the user database; and
performing, by the second node, a database recovery of the user database subsequent to the transaction lock being acquired by the second node, the database recovery restoring the user database up to a point of the failover event.

3. The method of claim 1, further comprising:
completing, by the first node, the user database transaction on the user database on the shared disk concurrent with the first node having the transaction lock, the completing of the user database transaction comprising committing to the user database transaction or rolling back the user database transaction; and
queuing the file for garbage collection based on the completing the user database transaction.

4. The method of claim 1, wherein the one or more database write operations comprise one or more data manipulation language (DML) write operations.

5. The method of claim 1, wherein the indication of the location of the data item comprises at least one of a database identification, a page identification, and a row identification.

6. The method of claim 1, wherein the lock information further comprises an identification of a type of the transaction lock.

7. The method of claim 1, wherein the lock file further comprises an identification of the user database transaction.

8. A system comprising:
at least one processor; and
a non-transitory computer-readable medium storing executable instructions that, when executed, cause the at least one processor to perform operations comprising:
receiving, by a first node of a plurality of nodes in a distributed database system on a shared disk cluster infrastructure, a transaction request to perform a user database transaction on one or more data items in a user database on a shared disk on the shared disk cluster infrastructure, the user database transaction comprising one or more database write operations for the one or more data items in the user database, and the shared disk being accessible by the plurality of nodes;
acquiring, by the first node, a corresponding transaction lock for each one of the one or more data items of the user database transaction;
storing a lock file for the user database transaction in a lock information database on the shared disk, the lock information database being a node-local database of the first node, the first node being the only node in the plurality of nodes able to write to the lock information database, the plurality of nodes other than the first node being able to read from the lock information database during a failover event for the first node, the lock file comprising corresponding lock information for each transaction lock of the user database transaction and an indication of a status of the user database transaction, and the corresponding lock information comprising an identification of a location of the corresponding data item for each corresponding transaction lock; and
storing a transaction record of the user database transaction in a transaction log in the user database on the shared disk subsequent to the storing of the lock file in the lock information database on the shared disk.

9. The system of claim 8, wherein the operations further comprise:
    detecting a failover event for the first node;
    accessing, by a second node of the plurality of nodes, the lock file in the lock information database of the first node on the shared disk based on the detecting the failover event;
    determining, by the second node, that the user database transaction is incomplete based on the indication of the status in the accessed lock file;
    acquiring, by the second node, each corresponding transaction lock for the one or more data items of the user database transaction based on the determination that the user database transaction is incomplete, causing the second node to be the only node in the plurality of nodes able to access the one or more data items in the user database; and
    performing, by the second node, a database recovery of the user database subsequent to the transaction lock being acquired by the second node, the database recovery restoring the user database up to a point of the failover event.

10. The system of claim 8, wherein the operations further comprise:
    completing, by the first node, the user database transaction on the user database on the shared disk concurrent with the first node having the transaction lock, the completing of the user database transaction comprising committing to the user database transaction or rolling back the user database transaction; and
    queuing the file for garbage collection based on the completing the user database transaction.

11. The system of claim 8, wherein the one or more database write operations comprise one or more data manipulation language (DML) write operations.

12. The system of claim 8, wherein the indication of the location of the data item comprises at least one of a database identification, a page identification, and a row identification.

13. The system of claim 8, wherein the lock information further comprises an identification of a type of the transaction lock.

14. The system of claim 8, wherein the lock file further comprises an identification of the user database transaction.

15. A non-transitory machine-readable storage medium, tangibly embodying a set of instructions that, when executed by at least one processor, causes the at least one processor to perform operations comprising:
    receiving, by a first node of a plurality of nodes in a distributed database system on a shared disk cluster infrastructure, a transaction request to perform a user database transaction on one or more data items in a user database on a shared disk on the shared disk cluster infrastructure, the user database transaction comprising one or more database write operations for the one or more data items in the user database, and the shared disk being accessible by the plurality of nodes;
    acquiring, by the first node, a corresponding transaction lock for each one of the one or more data items of the user database transaction;
    storing, by at least one processor, a lock file for the user database transaction in a lock information database on the shared disk, the lock information database being a node-local database of the first node, the first node being the only node in the plurality of nodes able to write to the lock information database, the plurality of nodes other than the first node being able to read from the lock information database during a failover event for the first node, the lock file comprising corresponding lock information for each transaction lock of the user database transaction and an indication of a status of the user database transaction, and the corresponding lock information comprising an identification of a location of the corresponding data item for each corresponding transaction lock; and
    storing, by the at least one processor, a transaction record of the user database transaction in a transaction log in the user database on the shared disk subsequent to the storing of the lock file in the lock information database on the shared disk.

16. The storage medium of claim 15, wherein the operations further comprise:
    detecting a failover event for the first node;
    accessing, by a second node of the plurality of nodes, the lock file in the lock information database of the first node on the shared disk based on the detecting the failover event;
    determining, by the second node, that the user database transaction is incomplete based on the indication of the status in the accessed lock file;
    acquiring, by the second node, each corresponding transaction lock for the one or more data items of the user database transaction based on the determination that the user database transaction is incomplete, causing the second node to be the only node in the plurality of nodes able to access the one or more data items in the user database; and
    performing, by the second node, a database recovery of the user database subsequent to the transaction lock being acquired by the second node, the database recovery restoring the user database up to a point of the failover event.

17. The storage medium of claim 15, wherein the operations further comprise:
    completing, by the first node, the user database transaction on the user database on the shared disk concurrent with the first node having the transaction lock, the completing of the user database transaction comprising committing to the user database transaction or rolling back the user database transaction; and
    queuing the file for garbage collection based on the completing the user database transaction.

18. The storage medium of claim 15, wherein the one or more database write operations comprise one or more data manipulation language (DML) write operations.

19. The storage medium of claim 15, wherein the indication of the location of the data item comprises at least one of a database identification, a page identification, and a row identification.

20. The storage medium of claim 15, wherein the lock information further comprises an identification of a type of the transaction lock.

* * * * *